(12) United States Patent
Takano et al.

(10) Patent No.: US 7,207,379 B2
(45) Date of Patent: Apr. 24, 2007

(54) AUTOMOTIVE AIR CONDITIONING SYSTEM

(75) Inventors: Yoshiaki Takano, Kosai (JP); Shun Kurata, Kariya (JP)

(73) Assignee: DENSO Corporation, Kariya (JP)

( * ) Notice: Subject to any disclaimer, the term of this patent is extended or adjusted under 35 U.S.C. 154(b) by 324 days.

(21) Appl. No.: 10/382,975

(22) Filed: Mar. 6, 2003

(65) Prior Publication Data

US 2003/0172667 A1 Sep. 18, 2003

(30) Foreign Application Priority Data

| Mar. 18, 2002 | (JP) | ............................. 2002-074328 |
| Mar. 19, 2002 | (JP) | ............................. 2002-076706 |

(51) Int. Cl.
*F25B 29/00* (2006.01)
*B60H 1/00* (2006.01)
*B60H 3/00* (2006.01)

(52) U.S. Cl. .......................... 165/202; 165/42; 165/43; 165/240; 165/241; 62/196.4; 62/133; 62/228.3; 62/238.6; 237/2 B

(58) Field of Classification Search ............... 62/196.4, 62/133, 228.3, 238.6; 165/202, 203, 204, 165/42, 43, 240, 241; 237/2 B
See application file for complete search history.

(56) References Cited

U.S. PATENT DOCUMENTS

| 4,206,613 | A | * | 6/1980 | Shockley | ...................... 62/133 |
| 4,556,942 | A | * | 12/1985 | Russo et al. | ................... 62/133 |
| 5,355,689 | A | * | 10/1994 | Hara et al. | .................. 62/196.4 |
| 5,546,755 | A | * | 8/1996 | Krieger | ........................ 62/133 |
| 6,105,375 | A | * | 8/2000 | Takano et al. | ............. 62/196.4 |
| 6,192,695 | B1 | * | 2/2001 | Hirota | ........................ 62/196.4 |
| 6,220,042 | B1 | * | 4/2001 | Robillard et al. | ........... 165/204 |
| 6,237,681 | B1 | * | 5/2001 | Takano et al. | ............. 62/196.4 |
| 6,397,613 | B1 | * | 6/2002 | Izawa et al. | ............... 62/196.4 |

FOREIGN PATENT DOCUMENTS

DE 26 13 485 10/1977

(Continued)

OTHER PUBLICATIONS

Patent Abstracts of Japan, Publication No. 11042934 dated Feb. 16, 1999.

*Primary Examiner*—John K. Ford
(74) *Attorney, Agent, or Firm*—Harness, Dickey & Pierce, PLC

(57) ABSTRACT

An automotive air conditioning system comprising a main heating unit 4 for heating air passing through an air conditioning duct 2 with cooling water of an engine E and a refrigeration cycle device 20 having a first refrigerant circulating circuit 21 which is a cooler mode and a second refrigerant circulating circuit 22 which is a heater mode and whose operation is controlled by an ECU 10, wherein while the automotive air conditioning system is operated in a heater mode functioning as auxiliary heating, in the event that a heating load is equal to or larger than a predetermined value, a refrigerant compressor 7 is kept switched off until a predetermined time $T_1$ has elapsed after the engine E has started.

In addition, a heating device is provided on the refrigerant compressor or an accumulator so that the refrigerant compressor or the accumulator is heated by the heating devices while the automotive air conditioning system is operated in the heater mode functioning as auxiliary heating.

9 Claims, 8 Drawing Sheets

FOREIGN PATENT DOCUMENTS

| | | |
|---|---|---|
| DE | 34 47 182 | 6/1986 |
| FR | 2675085 | 10/1992 |
| JP | 05-254336 | 10/1993 |
| JP | 11-42934 | 2/1999 |
| JP | 11042934 A * | 2/1999 |
| JP | 2000-142094 | 5/2000 |
| JP | 2001063348 A * | 3/2001 |

* cited by examiner

AUTOMOTIVE AIR CONDITIONING SYSTEM

BACKGROUND OF THE INVENTION

1. Field of the Invention

The present invention relates to an automotive air conditioning system for heating the interior of the passenger compartment of a vehicle, and more particularly to an automotive air conditioning system with a hot gas cycle for heating air passing through an air conditioning duct with an interior heat exchanger (an evaporator) provided inside the passenger compartment by causing hot, high-pressure gas refrigerant discharged from a refrigerant compressor to bypass an exterior heat exchanger (a condenser) provided outside the passenger compartment so as to be introduced directly to a pressure reducing device and then to the interior heat exchanger in that order.

2. Description of the Related Art

Generally used as an automotive air conditioning system or, in particular, as an automotive heating system, is a hot-water heating system for heating the interior of the passenger compartment of a vehicle by introducing engine cooling water to a hot-water heater located in an air conditioning duct so as to heat air passing through the air conditioning duct. With the hot-water heating system of this type, however, there is caused a drawback that a remarkable shortage of heating capacity is experienced, just after the hot-water heating system has been started, in the case where the heating system is activated, by starting the engine, when the temperatures of the outside air and cooling water are low.

With a view to eliminating the drawback, there has been proposed an automotive air conditioning system with a hot gas cycle which functions as an auxiliary heating system designed to assist the heating work of a main heating system, for heating the vehicle interior by making use of engine cooling water, by causing hot, high-pressure gas refrigerant (hot gas) compressed and discharged by a refrigerant compressor in a normal refrigeration cycle to bypass an exterior heat exchanger (a refrigerant condenser) so that the gas refrigerant is passed through a pressure reducing device and is then supplied to an interior heat exchanger (a refrigerant evaporator) located within an air conditioning duct so as to heat air passing through the air conditioning duct. Note that the refrigerant compressor is belt driven by the engine via an electromagnetic clutch.

When attempting to heat the vehicle interior quickly, in the event that the temperature of the engine cooling water is equal to or higher than a predetermined temperature, as the heating capacity of the main heating system is good enough to heat the vehicle interior, the refrigerant compressor is controlled to be switched off so as to stop the hot gas cycle, while in the event that the temperature of the cooling water is lower than the predetermined temperature, as the heating capacity of the main heating system is not sufficient to do the required work, the refrigerant compressor is controlled to be switched on so as to activate the hot gas cycle.

Here, the hot gas cycle works differently from a normal heat pump cycle in which the interior heat exchanger provided inside the passenger compartment is caused to work as a refrigerant condenser and the exterior heat exchanger provided outside the passenger compartment is caused to work as the refrigerant evaporator and is designed such that heat resulting from the compression work of the refrigerant compressor is dissipated from the interior heat exchanger (the refrigerant evaporator in the cooling mode), and therefore, the hot gas cycle can operate at extremely low outside air temperatures such as those in the vicinity of −40° C.

In the related art, however, when the temperature is extremely low and is, for example, −20° C. or lower, due to the property of the refrigerant called HFC-134a, there occurs a case where a negative pressure (a pressure lower than the atmospheric pressure, such as an atmospheric pressure of 0 kg/cm$^2$G at −26° C.) is created before the refrigerant compressor is activated. In addition, due to the property of the hot gas cycle, as an intake pressure taken into an intake portion of the refrigerant compressor just after the compressor has been activated tends to rise gradually after the intake pressure has lowered once, it is confirmed that the frequency at which the negative pressure is created at the intake portion of the refrigerant compressor is very high.

Incidentally, as to the fact that the negative pressure is created at the intake portion, in engine-driven type refrigerant compressors that are currently used commonly, a shaft seal portion is found to be weak, and when the intake pressure of the refrigerant compressor lowers to or below a predetermined value (for example, −0.5 kg/cm$^2$G), there is caused a possibility that air enters the interior of the refrigerant compressor from the shaft seal portion. As an ingress of air into the interior of the refrigerant compressor like this results in the generation of corrosion within the cycle or an abnormal rise of the high pressure (condensing pressure) at the time of cooling, such an ingress of air must be prevented.

With a view to eliminating the above drawback, in a related art disclosed in U.S. Pat. No. 6,237,681, in the event that a physical amount related to an intake pressure taken into a refrigerant compressor, that is detected by an intake pressure detecting device, becomes smaller than a predetermined value when a hot gas cycle is activated in a condition where the outside air temperature is extremely low, the refrigerant compressor is automatically stopped so as to stop the operation of an auxiliary heating system, whereby a reduction in intake pressure of the refrigerant compressor, that occurs just after the refrigerant compressor has been activated, can be prevented, the generation of a negative pressure at the intake portion of the refrigerant compressor being thereby prevented.

Furthermore, under a low temperature environment where the outside air temperature falls to or below −10° C., as the temperature and pressure of the refrigerant decrease to thereby increase the specific volume of the refrigerant, the weight flow rate of refrigerant, that is taken into the refrigerant compressor, becomes smaller and hence, the refrigerant compressor does not work sufficiently, resulting in a shortage of an auxiliary heating capacity.

With a view to eliminating the drawback, in a related art disclosed in Japanese Unexamined Patent Publication (Kokai) No. 11-42934, as shown in FIG. 8, a refrigerant heating unit 9 is provided for heating a refrigerant flowing through a refrigerant flow path 30 extending from an exit of a refrigerant evaporator 6 to an intake opening of a refrigerant compressor 7. The provision of the refrigerant heating unit 9 increases the temperature and pressure of refrigerant that is taken into the refrigerant compressor 7, and the specific volume of the refrigerant is decreased, while the weight flow rate of the refrigerant is increased, whereby the refrigerant compressor is allowed to work sufficiently, thereby making it possible to increase the auxiliary heating capacity.

In the related art disclosed in the above Japanese Unexamined Patent Publication, however, while the auxiliary heating capacity is increased by heating a low pressure side (from the exit of the refrigerant evaporator to the intake opening of the refrigerant compressor) of the hot gas cycle, the related art was not effective against a drawback that internal components of the refrigerant compressor wear or fail due to an ingress of air into the interior of the refrigerant compressor resulting from the generation of a negative pressure, which is lower than the atmospheric pressure, occurring in the interior of the compressor when the hot gas cycle is activated in a condition where the outside air temperature is extremely low, or insufficient lubrication of the interior of the refrigerant compressor resulting from no return of refrigerant and oil to the compressor after it has been activated due to the low pressure and density of the refrigerant.

However, the inventors of the present invention recognized that the temperature of refrigerant within the hot gas cycle (in particular, within the refrigerant compressor) tends to continue to increase at all times once the engine has been started. This tendency was considered to be grounded on the facts that heat generated from the engine is conducted to the refrigerant compressor, as the refrigerant compressor is fixed to the engine, and that heat building up inside the engine compartment is conducted to the interior of the hot gas cycle. The inventors then considered, based upon this rationale, that, as the weight of refrigerant per volume increases and the temperature within the hot gas cycle increases with passage of certain time without estimating an intake pressure, the generation of a large magnitude of negative pressure in the refrigerant compressor can be prevented and the return of refrigerant and oil from the refrigerant condenser and so on can be improved.

SUMMARY OF THE INVENTION

The present invention was made based upon the aforesaid knowledge and considerations, and an object thereof is to provide an automotive air conditioning system which can prevent the ingress of air into the interior of a refrigerant compressor, when a hot gas cycle is activated, to thereby prevent the generation of corrosion within the hot gas cycle due to the ingress of air into the interior of the compression without providing an intake pressure detecting unit and improving a shaft seal portion of the refrigerant compressor, and which can improve the return of refrigerant and oil from a refrigerant condenser to the refrigerant compressor when the hot gas cycle is activated.

According to one aspect of the present invention, there is provided an automotive air conditioning system comprising a main heating unit for heating air passing through the interior of an air conditioning duct with engine cooling water and a refrigeration cycle unit having a first refrigerant circulating circuit for a cooler mode and a second refrigerant circulating circuit for a heater mode which is auxiliary heating and designed such that the operation of the automotive air conditioning system is controlled by an air controlling unit, wherein a refrigerant compressor is switched off until a predetermined time $T_1$ has elapsed after an engine is activated in the event that the heating load is equal to or larger than a predetermined value while the automotive air conditioning system is operated in the heater mode which is auxiliary heating. According to this construction, as heat generated from the engine is conducted to the refrigerant compressor and warms up the interior of an engine compartment, the temperature of refrigerant within the hot gas cycle, which is the second refrigerant circulating circuit, is increased and the weight of refrigerant per volume is increased, whereby the generation of a large negative pressure within the refrigerant compressor is prevented and the return of refrigerant and oil to the refrigerant compressor can be improved.

In the automotive air conditioning system of the present invention, any of the outside air temperature, the inside air temperature, the refrigerant evaporator downstream air temperature and the cooling water temperature is used as a numerical value representing the heating load.

In the automotive air conditioning system of the present invention, a heater is mounted along the path of the second refrigerant circulating circuit, and the heater is kept switched on after the engine has been started when the automotive air conditioning system is operated in the heater mode, while the refrigerant compressor may be kept switched off only for a time $T_2$ which is shorter than the predetermined time $T_1$. Thus, even in the event that a time during which the refrigerant compressor is switched off is shorter, the activation of the hot gas cycle can be started without generating a large negative pressure within the refrigerant compressor by heating the second refrigerant circulating circuit also with the heater when the engine is activated. Consequently, the time needed until the passenger can feel warmth can be shortened.

In the automotive air conditioning system of the present invention, the heater may be provide in an accumulator. The refrigerant can be heated effectively by the provision of the heater in the accumulator which is a reservoir of refrigerant.

According to another aspect of the present invention, there is provided an automotive air conditioning system having an auxiliary heating function for causing hot, high-pressure refrigerant discharged from a refrigerant compressor at the time of heating to bypass a refrigerant condenser so as to be introduced directly to a refrigerant evaporator so that air is heated with this refrigerant evaporator, wherein a heating unit is provided in the refrigerant compressor for heating the refrigerant compressor when the heating load is equal to or larger than a predetermined value in attempting to start the auxiliary heating function working. According to the construction, the increase in the temperature of refrigerant within a hot gas cycle which performs the auxiliary heating function when the outside air temperature is extremely low can be improved and a time needed before the hot gas starts to operate can be shortened, whereby a time needed before the passenger can feel warmth can be shortened. In addition, the pressure within the refrigerant compressor when the hot gas operates can be increased, whereby an ingress of air into the refrigerant compressor can be prevented.

In the automotive air conditioning system of the present invention, the refrigerant compressor is coupled to the engine via a clutch.

In the automotive air conditioning system of the present invention, a refrigerant compressor having a vapor-liquid separator therein is used as the refrigerant compressor, whereby both the compressor and the vapor-liquid separator may be heated by the heating unit. According to the construction, in operating the hot gas cycle when the outside air temperature is extremely low, by warming up liquid refrigerant remaining in the vapor-liquid separator, refrigerant is evaporated, whereby the density and flow rate of refrigerant are increased, the auxiliary heating capacity being thereby increased remarkably.

In the automotive air conditioning system of the present invention, an electric heater provided in the interior or on the circumference of the refrigerant compressor, or on the circumference of the vapor-liquid separator may be adopted as the heating unit.

In the automotive air conditioning system of the present invention, the refrigerant compressor is heated with the heating unit, after the engine has been started up, when the heating load is equal to or larger than the predetermined value, and in the event that a hot gas switch is not turned on even after a predetermined time (T2) has elapsed, the heating unit is switched off. According to this construction, unnecessary heating by the heating unit can be prevented.

The present invention may be more fully understood from the description of preferred embodiments of the invention, as set forth below, together with the accompanying drawings.

DESCRIPTION OF THE PREFERRED EMBODIMENTS

Figure 1:
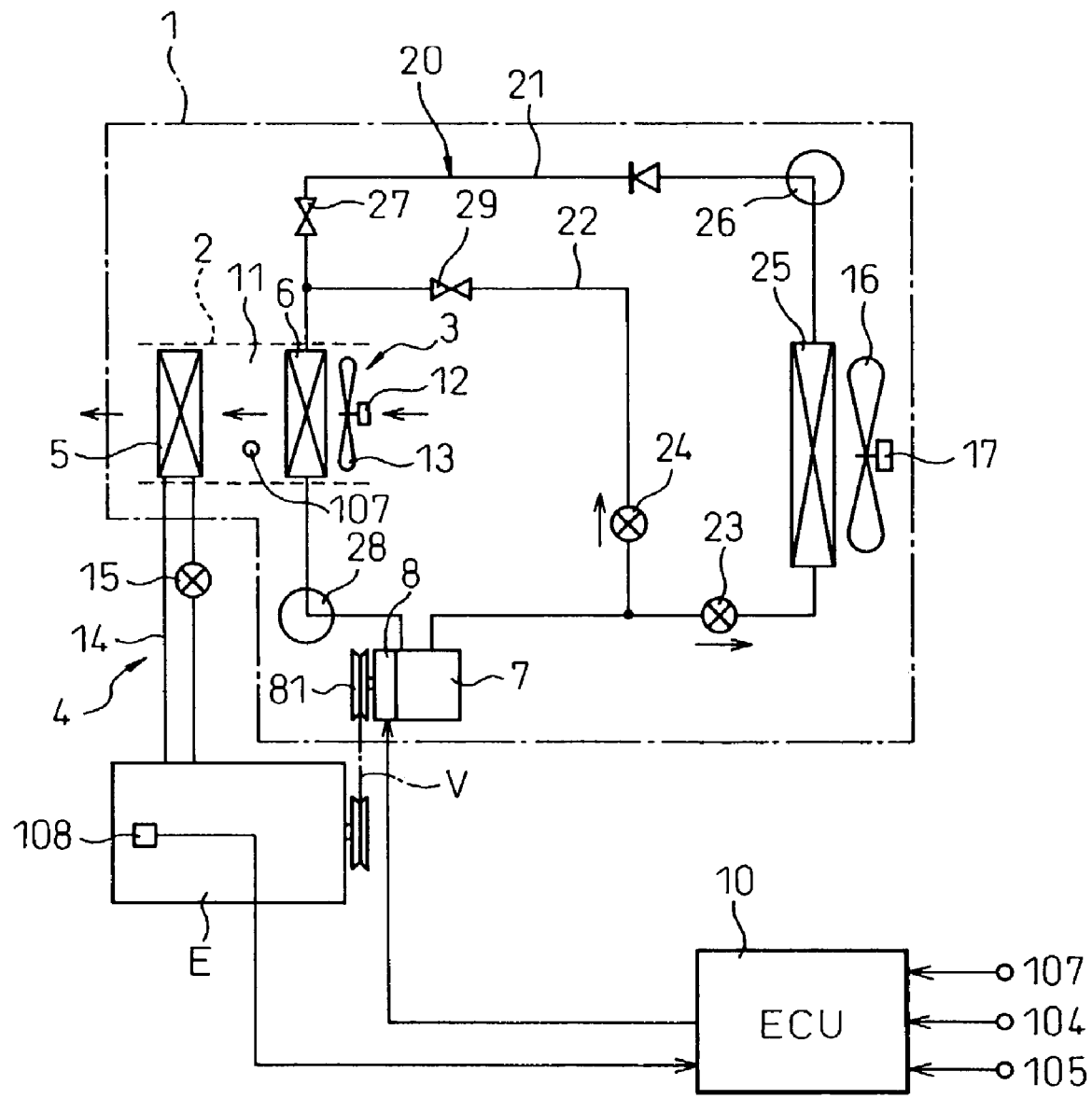
FIG. 1 is a diagram showing the overall construction of an automotive air conditioning system according to a first embodiment of the present invention.

Automotive air conditioning systems according to embodiments of the present invention will be described below with reference to the accompanying drawings. Note that, while the present invention is described as being applied to an automotive air conditioning system, the present invention may be applied appropriately to a general air conditioning system. FIG. 1 is a diagram showing the overall construction of an automotive air conditioning system according to a first embodiment of the present invention.

The automotive air conditioning system shown in FIG. 1 is constructed such that respective air conditioning components in an air conditioning unit 1 for air conditioning the interior of a passenger compartment of an automobile, in which an engine E functioning as a main heat source for heating is installed, are controlled by an air conditioning control unit (ECU) 10.

The air conditioning unit 1 comprises an air conditioning duct 2 constituting an air passage 11 for introducing air conditioning air into the interior of a passenger compartment. Provided at an upstream-most end of the air conditioning duct 2 are an outside air intake opening, an inside air intake opening and an inside air/outside air switching door (none shown in the figure), and a centrifugal blower 3 is provided downstream thereof. In addition, provided at a downstream-most end of the air conditioning duct 2 are outlets such as defroster outlets, face outlets or foot outlets and mode switching doors (not shown).

A hot-water heater 5 of a hot-water heating unit (a main heating unit) for re-heating air that has passed through a refrigerant evaporator 6, which will be described later, is provided upstream of the outlets. This hot-water heater 5 is placed at an intermediate position along the length of a cooling water circulating circuit 14 in which a circulating flow of cooling water is generated by a water pump (not shown) driven by the engine E. Then, when a hot-water valve 15 placed at a position along the length of the cooling water circulating circuit 14 is opened, cooling water that absorbs therein heat discharged from the engine E is circulated in the hot-water heater 5, and the hot-water heater 5 re-heats air using this cooling water as a heat source for heating. Here, the hot-water heating unit (the main heating unit) 4 is constituted by the engine E, the hot-water heater 5, the cooling water circulating circuit 14 and the hot-water valve 15.

A refrigerant evaporator 6 constituting a constituent component of a refrigeration cycle device 20 installed in the automobile is disposed between the centrifugal blower 3 and the hot-water heater 5 in such a manner as to totally close the air passage 11 within the air conditioning duct 2. This refrigeration cycle device 20 comprises a first refrigerant circulating circuit (a refrigeration cycle) 21, a second refrigerant circulating circuit (a hot gas cycle) 22, and first and second electromagnetic valves 23, 24 for switching circuits between these first and second circuits 21, 22.

The first refrigerant circulating circuit 21 is a refrigerant circuit for circulating hot, high-pressure gas refrigerant discharged from a refrigerant compressor 7 through the first electromagnetic valve 23, a refrigerant condenser 25, a receiver (a vapor-liquid separator) 26, a first pressure reducing device 27, the refrigerant evaporator 6, and an accumulator (a vapor-liquid separator) 28 back to the refrigerant compressor 7 in that order. In addition, the second refrigerant circulating circuit 22 is a refrigerant circuit for circulating hot, high-pressure gas refrigerant (hot gas) discharged from the refrigerant compressor 7 through the second electromagnetic valve 24, a second pressure reducing device 29, the refrigerant evaporator 6, and the accumulator 28 back to the refrigerant compressor 7 in that order. Note that the first pressure reducing device 27 and the second pressure reducing device 29 may be incorporated into a single pressure reducing device so as to be commonly used for the refrigeration cycle and the hot gas cycle.

In the refrigeration cycle device 20, when the first electromagnetic valve 23 opens and the second electromagnetic valve 24 closes, refrigerant circulates through the first refrigerant circulating circuit 21, whereas when the first electromagnetic valve 23 closes and the second electromagnetic valve 24 opens, refrigerant circulates through the second refrigerant circulating circuit 22. Note that a circulating circuit switching device is constituted by the first and second electromagnetic valves 23, 24. In addition, reference numeral 16 denotes a cooling fan driven to rotate by a driving motor 17 for forcibly blowing outside air against the refrigerant condenser 25.

The refrigerant evaporator 6 is such as to correspond to an interior heat exchanger provided inside the passenger compartment and works as a cooling heat exchanger for evaporating low-temperature, vapor-liquid two-phase refrigerant that flows thereinto from the first pressure reducing device 27 when refrigerant flows through the first refrigerant circulating circuit 21 to thereby cool air passing therethrough.

In addition, the refrigerant evaporator 6 works as a heating heat exchanger (an auxiliary heating unit) for allowing high-temperature or hot gas refrigerant that flows thereinto from the second pressure reducing device 29 when refrigerant flows through the second refrigerant circulating circuit 22 to flow therethrough to thereby heat air passing therethrough.

The refrigerant compressor 7 is an engine-driven compressor for compressing refrigerant taken thereinto from an intake opening thereof and discharging hot, high-pressure gas refrigerant from a discharge opening thereof. In this case, either a variable-displacement type compressor or a fixed-displacement compressor may be used. Connected to a shaft of this refrigerant compressor 7 is an electromagnetic clutch 8 for effecting and cutting off the transmission of the rotating power of the engine E to the refrigerant compressor 7. In addition, a V-belt is wound around a pulley 81 of the electromagnetic clutch 8. The V-belt is also wound around a crank pulley of the engine E to thereby enable the transmission of the rotating power of the engine E to the refrigerant compressor 7.

When the electromagnetic clutch 8 is in an energized (ON) condition, the rotating power of the engine E is transmitted to the refrigerant compressor 7 via the V-belt and the electromagnetic clutch 8, whereby the refrigeration cycle is activated and the air cooling operation or air heating operation is implemented by the refrigerant evaporator 6. In addition, when the electromagnetic clutch 8 is in a de-energized (OFF) condition, the power of the engine E is not transmitted to the refrigerant compressor 7, and the air cooling operation or the air heating operation by the refrigerant evaporator 6 is stopped.

Respective switch signals from respective switches on a control panel (not shown) provided at the front of the passenger compartment are inputted into the ECU (the air conditioning electric control unit) 10 for controlling respective air conditioning components in the air conditioning unit 1. Placed on the control panel are a hot gas switch, a mode changeover switch for changing over air conditioning modes between a cooler mode (cooling operation) and a heater mode (heating operation), a temperature setting switch for setting the temperature inside the passenger compartment to a desired temperature, an air conditioner switch for commanding the refrigeration cycle device 20 to be activated or stopped and a blower switch for commanding the centrifugal blower 3 to be switched on or off.

Additionally, a known microprocessor comprising a CPU, a ROM, and a RAM is provided in the interior of the ECU 10, and signals from respective sensors are configured to be inputted into the microprocessor after the signals are A/D converted by an input circuit, not shown. Furthermore, when an ignition switch (IG), which governs the start and stop of the engine E of the automobile, is closed (ON), the ECU 10 is configured to start a control process with a direct-current power supply being supplied thereto from a battery (not shown) which is an onboard power supply installed in the automobile.

Signals from an inside air temperature sensor 104 for detecting the temperature of air inside the passenger compartment (inside air temperature), an outside air temperature sensor 105 for detecting the temperature of air outside the passenger compartment (outside air temperature), a post-evaporator temperature sensor 107 for detecting the temperature of air that has just passed through the refrigerant evaporator 6 (evaporator downstream air temperature) and a cooling water temperature sensor 108 for detecting the temperature of cooling water that flows into the hot-water heater 5 are inputted into the air conditioning control ECU 10, respectively. Note that the aforesaid respective switches and sensors are intended to detect air conditioning environmental factors needed to condition air inside the passenger compartment of the automobile, and thermistors are used in the inside air temperature sensor, outside air temperature sensor, post-evaporator temperature sensor and the cooling water temperature sensor. In addition, a measuring device is provided in the ECU 10 for computing the time that has elapsed since the engine started.

Figure 2:
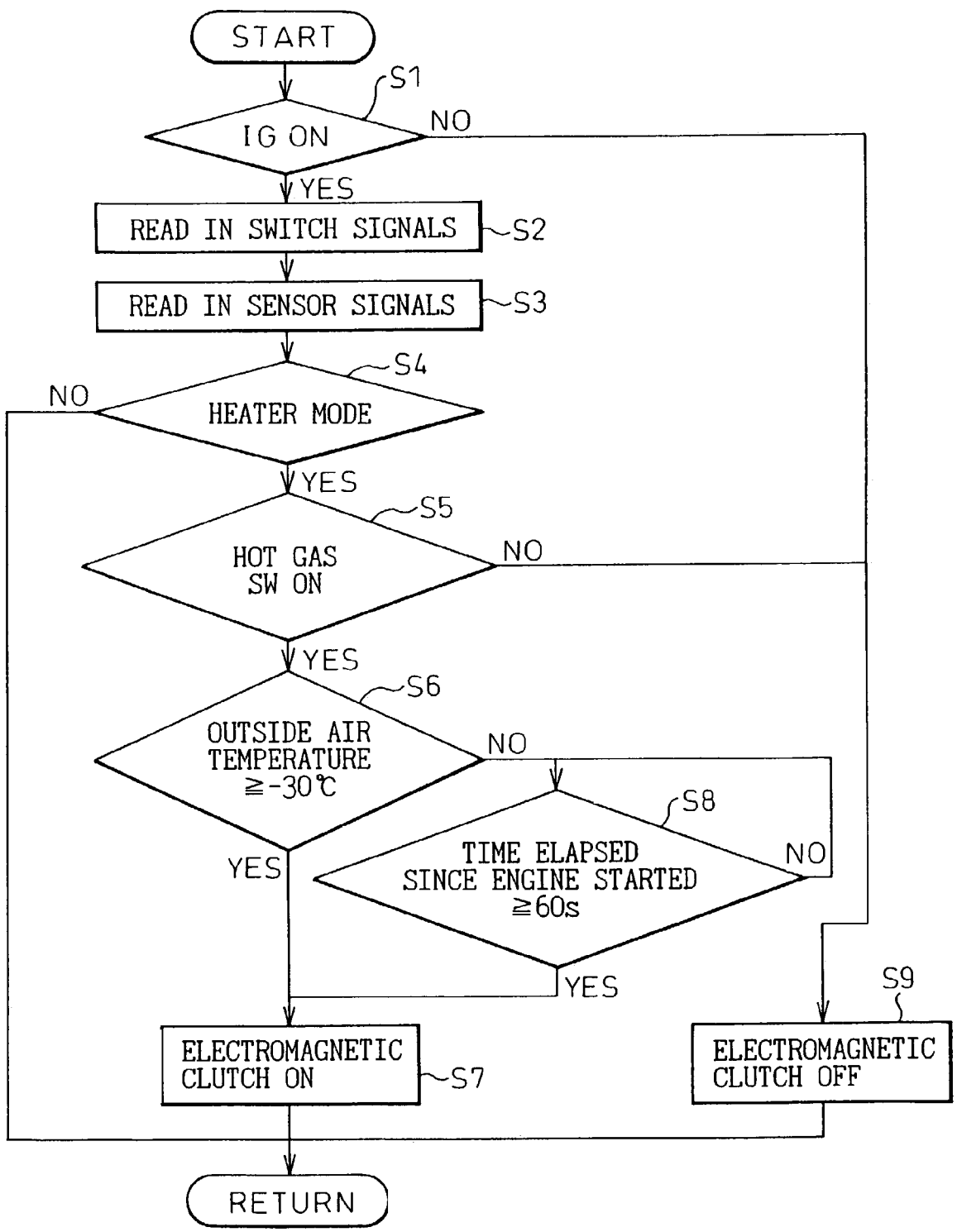
FIG. 2 is a flow chart showing the operation of a hot gas when the automotive air conditioning system according to the first embodiment is operated in a heater mode.

Next, the hot gas operation of the automotive air conditioning system constructed as described above according to the first embodiment which constitutes a feature of the present invention will be described based on a flow chart shown in FIG. 2.

In step S1, the ignition switch (IG) is switched on, and a direct-current power supply is supplied to the ECU 10. Then, in step S2, signals are read in from the respective switches on the air conditioner control panel. In step S3, signals are read in from the respective sensors. To be specific, outside air temperature, inside air temperature, evaporator downstream air temperature and cooling water temperature are read in.

Next, whether or not the air conditioning mode is in the heater (heating) mode is determined (step S4). Namely, whether or not the air conditioning mode is set to the heater mode using the mode changeover switch is determined. If the result of the determination is NO, then the routine exits as shown in FIG. 2.

If the result of the determination in step S4 is YES, or in the event that the air conditioning mode is in the heater mode, whether or not the hot gas switch is closed (ON) is determined (step S5). If the result of the determination is NO, then the routine exits as shown in FIG. 2 after the energization to the electromagnetic clutch 8 is stopped so as to stop the refrigerant compressor 7 automatically.

In addition, if the result of the determination in step S5 is YES, or in the event that the hot gas switch is switched on, then, the process advances to step S6, and whether or not the heating load is equal to or larger than a predetermined value is determined. For example, whether or not, as the heating load, the outside temperature is lower than the predetermined value (−30° C.) is determined. Note that in addition to outside air temperature, inside air temperature, evaporator downstream air temperature or cooling water temperature may be adopted as the heating load. In addition, the predetermined value can be set appropriately.

If the result of the determination in step S6 is YES, namely, in the event that the outside temperature is equal to or higher than −30° C., the electromagnetic switch 8 is switched on (step S7), and then, the refrigerant compressor 7 being activated, the first electromagnetic valve 23 being closed, and the second electromagnetic valve 24 being opened, the hot gas operation is started in the second refrigerant circulating circuit (the hot gas cycle) 22 as designed.

If the result of the determination in step S6 is NO, or in the event that the outside temperature is lower than −30° C., the time that has elapsed since the engine was started is computed, which is a feature of the present invention, and in step S8, whether or not a time $T_1$, that has elapsed since the engine was started, is equal to longer than 60 seconds is determined. Then, the process advances to step S7 after 60 seconds has elapsed since the engine was started, where the electromagnetic clutch 8 being switched on, the refrigerant compressor 7 being activated, the first electromagnetic valve 23 being closed, and the second electromagnetic valve 24 being opened, the hot gas cycle operation is started in the second refrigerant circulating circuit.

Thus, according the first embodiment of the present invention, in the event that the heating load is equal to or larger than the predetermined value, the hot gas cycle operation is designed to be activated after a predetermined time T1, for example, 60 seconds, has elapsed since the engine was started, whereby heat from the engine is conducted directly to the refrigerant compressor and the interior of the engine compartment is warmed up, and the heat is conducted to the interior of the hot gas cycle to thereby increase the temperature inside the cycle. Thus, even if the intake pressure of the refrigerant compressor is not estimated, which is required for the related art automotive air conditioning system, the temperature within the hot gas cycle increases with passage of a certain time and the refrigerant weight per volume increases, whereby the generation of a large negative pressure in the refrigerant compressor can be prevented, and the return of refrigerant and oil can be improved.

Figure 3:
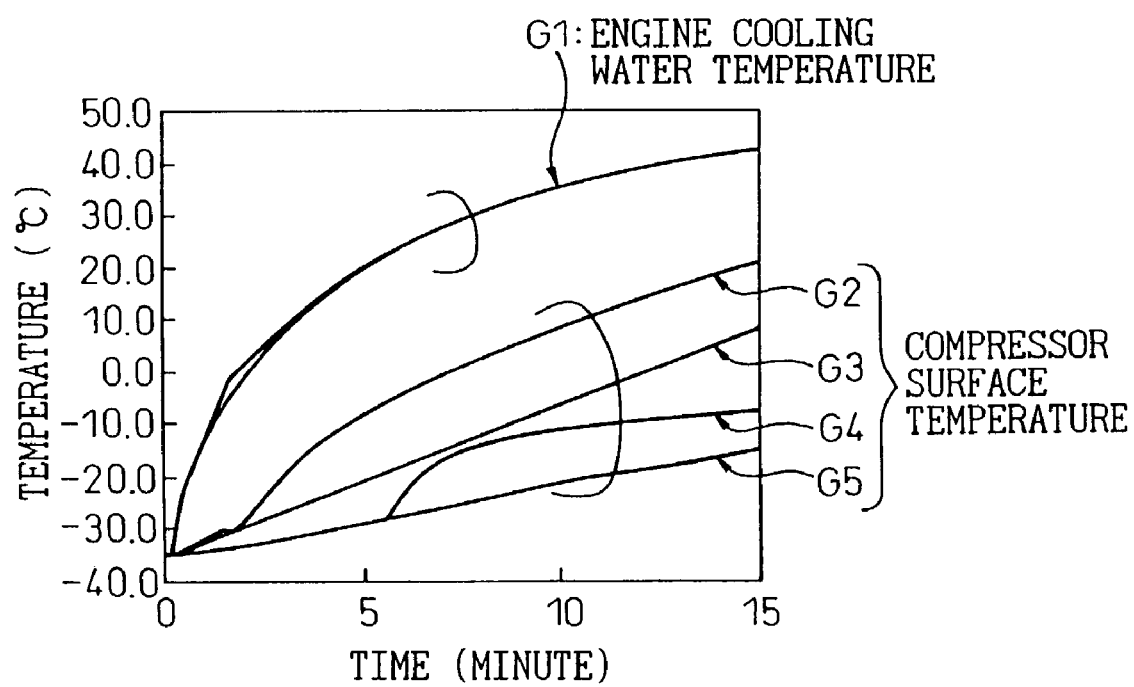
FIG. 3 is a graph showing a tendency for the temperature of cooling water and the surface temperature of a compressor to increase after an engine has been started up.

FIG. 3 is a graph showing how the temperature of engine cooling water and the surface temperature of the compressor rose after the engine was started up. The axis of abscissas represents time (minutes) and the axis of ordinates represents temperature (° C.). In the graph, a curve G1 represents the temperature of engine cooling water, a curve G2 represents the surface temperature of the compressor resulting when a variable-displacement compressor was used as the compressor and the hot gas operation was activated after 1 minute had elapsed since the engine was started, a curve G3 represents the surface temperature of the compressor resulting when a variable-displacement compressor was used as the compressor and there was activated no hot gas operation, a curve G4 represents the surface temperature of the compressor resulting when a fixed-displacement compressor was used as the compressor and the hot gas operation was activated after 5 minutes had elapsed since the engine was started, and G5 represents the surface temperature of the compressor resulting when a fixed-displacement compressor was used as the compressor and no hot gas operation was activated.

The reason why the slopes of the rising curves of the surface temperatures of the variable-displacement compressors are steeper than those of the rising curves of the surface temperatures of the fixed-displacement compressors is because with the variable-displacement compressors, the shaft rotated idly at the same time as the engine was started, whereby heat was generated in the compressor and the temperature inside the compressor was increased largely. Thus, in FIG. 2, with the variable-displacement compressor being used, switching the electromagnetic clutch on and off means that the capacity is controlled so as to become larger than 0% and that the capacity is controlled so as to become 0%, respectively.

Figure 4:
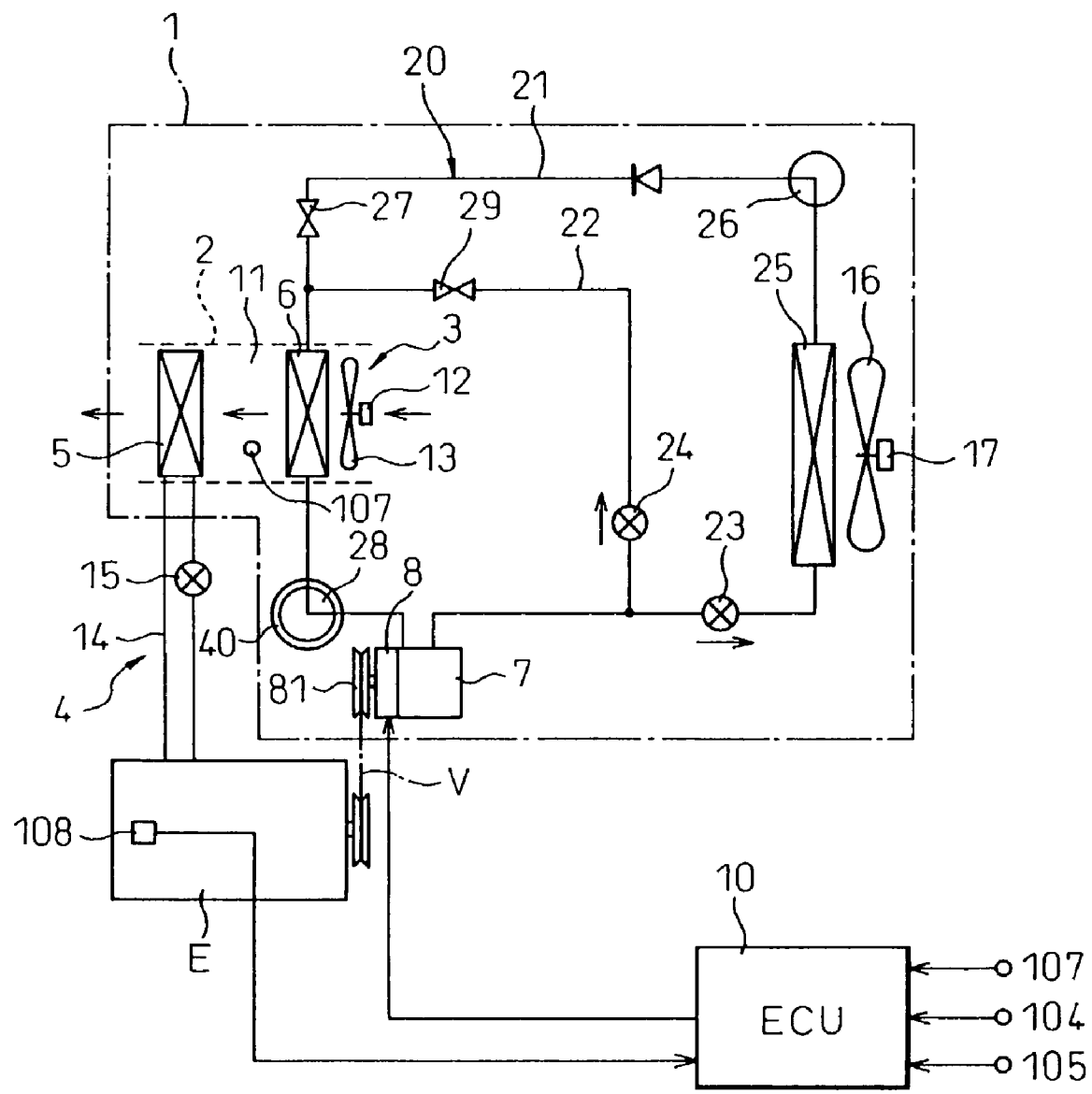
FIG. 4 is a diagram showing the overall construction of an automotive air conditioning system according to a second embodiment of the present invention.

FIG. 4 is a diagram showing the overall construction of an automotive air conditioning system according to a second embodiment of the present invention. In this second embodiment, a heater 40 is mounted along a path within a hot gas cycle which is a second refrigerant circulating circuit 22, for example, on the circumference or in the interior of an accumulator 28. Then, the accumulator 28 is designed to be heated for a predetermined time with a command from an ECU 10. The remaining construction of the automotive air conditioning system of the second embodiment remains the same as the automotive air conditioning system according to the first embodiment. Electric heaters such as a PTC heater, a nichrome wire heater and a glow plug heater are preferred to be used as the heater 40.

Figure 5:
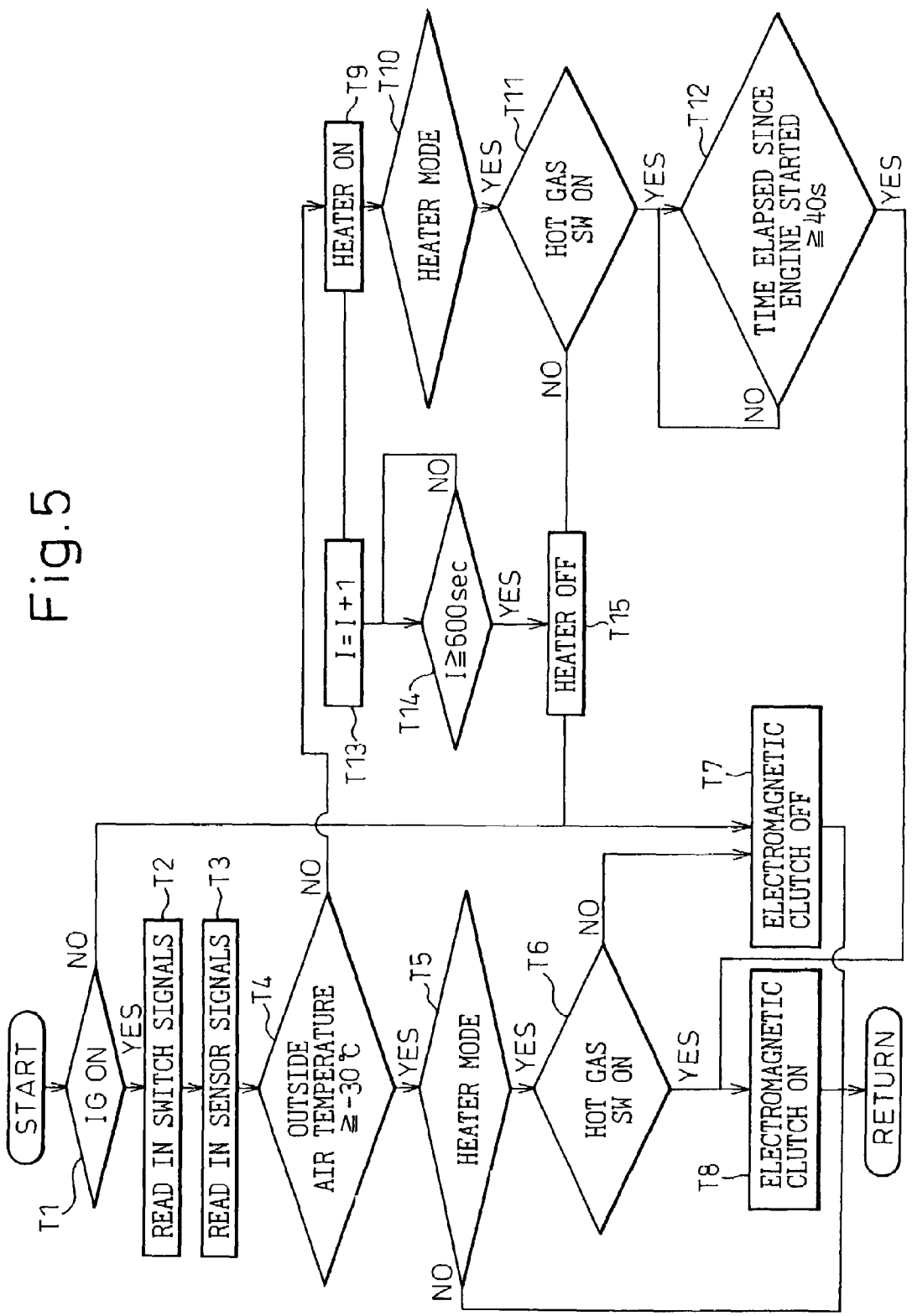
FIG. 5 is a flow chart showing the operation of a hot gas when the automotive air conditioning system according to the second embodiment is operated in a heater mode.

Next, the hot gas operation of the automotive air conditioning system according to the second embodiment of the present invention will be described based upon a flow chart shown in FIG. 5.

In step T1, when an ignition switch (IG) is switched on, a direct-current power supply is supplied to the ECU 10. Then, signals from respective switches on an air conditioner control panel are read (step T2). In addition, signals from respective sensors are also read (step T3). To be specific, an outside air temperature, an inside air temperature, an evaporator downstream air temperature and a cooling water temperature are read.

Next, in step T4, whether or not the heating load is equal to or larger than a predetermined value is determined. For example, as the heating load, whether or not the outside air temperature is lower than the predetermined value (−30° C.) is determined. Selecting the heating load and setting the predetermined value therefor are identical with those of the first embodiment.

If the result of the determination in step T4 is YES, or in the event that the outside air temperature is equal to or higher than −30° C., the process advances to step T5, and whether or not the air conditioning mode is in the heater mode is determined. If the result of the determination is NO, then the routine exits as shown in FIG. 5, whereas if the result of the determination is YES, then the process advances to step T6, and whether or not the hot gas switch is switched on is determined. If the result of the determination is NO, then the process advances to step T7, where an electromagnetic clutch 8 is switched off to thereby stop the refrigerant compressor 7. If the result of the determination is YES, then the electromagnetic clutch 8 is switched on to thereby activate the refrigerant compressor 7, whereby the hot gas cycle operation is started. Part of the routine that has been described heretofore is identical to that of the first embodiment.

The routine according to the second embodiment is characterized by part thereof that will be described below. Namely, in step T4, if the result of the determination is NO and in the event that the heating load is equal to or larger than the predetermined value, for example, in the event that the outside air temperature is lower than −30° C., then, the process advances to step T9, and the heater 40 of the accumulator 28 is switched on. Following this, in step T10, whether or not the air conditioning mode is in the heater mode is determined. If the result of the determination in step T10 is YES, then, the process advances to step T11, where whether or not the hot gas switch is switched on is determined. When the heater is switched on in step T9, then, the process advances to step T13, where the heating time of the heater 40 is computed, and in step T14, if the heating time exceeds 600 seconds, then, the process advances to T15, where the heater 40 is switched off.

If the result of the determination in step T11 is NO, then advance to step T15, where the heater 40 is switched off. In contrast, if the result of the determination in the step T11 is YES, or in the event that the hot gas switch is switched on, then, the process advances to step T12, where whether or not the time that has elapsed after the engine was started is equal to or longer than a predetermined time $T_2$, for example, 40 seconds, is determined, and if the time that has elapsed is determined to be equal to or longer than 40 seconds, then the electromagnetic clutch 8 is switched on, whereby the refrigerant compressor 7 starts to operate the hot gas cycle.

Thus, according to the second embodiment, in the event that the outside air temperature, which is the heating load, is lower than the predetermined value (for example, −30° C.) after the engine has been started, the heater 40 is switched on. In the event that the hot gas switch is not switched on a predetermined time $T_1$ (for example, 600 seconds) after the heater 40 has been switched on, then the heater 40 is switched off. In contrast, in the event that the hot gas switch is switched on, then the heater 40 is kept switched on as it is (until 600 seconds has elapsed).

Thus, according to the second embodiment, the heater 40 has been switched on before the hot gas cycle operates, and due to this, when activated in a condition where the outside air temperature is extremely low, the increase in the temperature of refrigerant within the hot gas cycle is improved, and the time needed before the hot gas cycle operates becomes shorter than that of the first embodiment, whereby the time needed before the passenger feels warmness becomes shorter accordingly.

Figure 6:
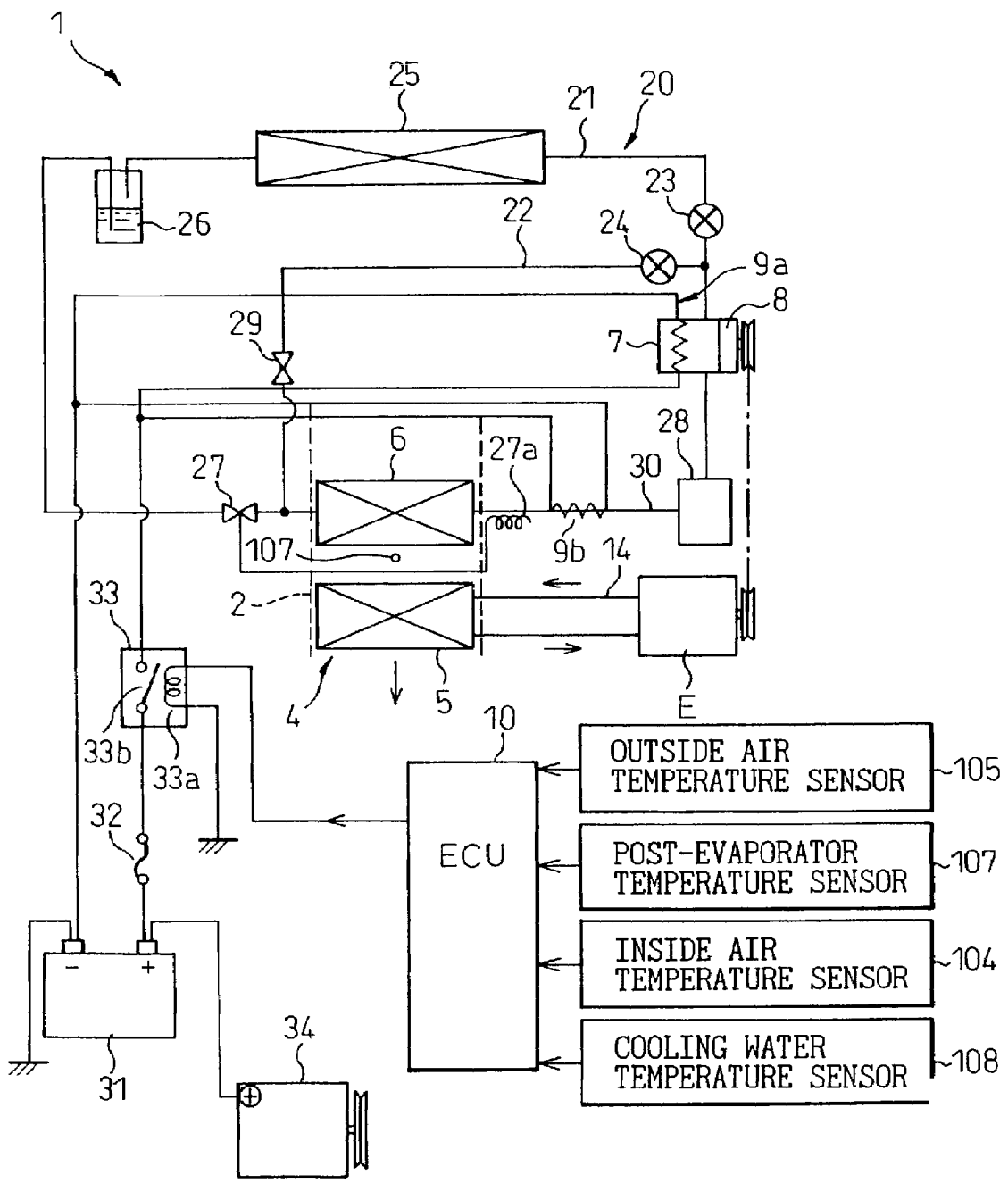
FIG. 6 is a diagram showing the overall construction of an automotive air conditioning system according to a third embodiment of the present invention.

FIG. 6 is a diagram showing the overall construction of an automotive air conditioning system according to a third embodiment o the present invention. Basic constituent parts of the automotive air conditioning system of the third embodiment are identical with those of the automotive air conditioning systems according to the first and second embodiments shown in FIGS. 1 and 4, respectively.

The automotive air conditioning system according to the third embodiment is constructed such that respective air conditioning devices (actuators) in an air conditioning unit 1 for air conditioning the interior of the passenger compartment of an automobile an engine E installed therein, which is a main heat source for heating, are controlled by an air conditioning electric control unit (ECU) 10.

The air conditioning unit 1 comprises an air conditioning duct 2 for introducing air conditioning air into the passenger compartment, and an outside air intake opening, an inside air intake opening and an inside air/outside air switching door (none shown in the figure) are provided at an upstream-most end of the air conditioning duct 2, and a centrifugal blower 3 (refer to FIG. 1) is provided downstream of the openings and the door. In addition, outlets such as defroster outlets, face outlets or foot outlets and mode switching doors (not shown) are provided at a downstream-most end of the air conditioning duct 2.

Next, a hot-water heater 5 for a hot-water heating unit 4 which is a main heating unit for re-heating air that has passed through a refrigerant evaporator 6, which will be described later, is provided downstream of the outlets. This hot-water heater 5 is placed at an intermediate position along the length of a cooling water circulating circuit 14 in which a circulating flow of cooling water is generated by a water pump (not shown) that is driven by the engine E. Cooling water that has absorbed therein heat discharged from the engine E is circulated in the interior of the hot-water heater 5, and the hot-water heater 5 uses this cooling water as a heat source for heating and re-heat air.

The evaporator 6 constituting one of constituent components of a refrigeration cycle device 20 installed in the automobile is disposed upstream of the hot-water heater 5 in the air conditioning duct 2 in such a manner as to close totally an air passage within the air conditioning duct 2. The refrigeration cycle device 20 comprises a first refrigerant circulating (refrigeration cycle) circuit 21 having a cooling function, a second refrigerant circulating (hot gas heater) circuit 22 having an auxiliary heating function, and first and second electromagnetic valves 23, 24 for switching circuits between the refrigeration cycle circuit 21 and the hot gas heater circuit 22.

The first refrigerant circulating (refrigeration cycle) circuit 21 is such as to correspond to a cooling and dehumidifying unit and circulates hot, high-pressure gas refrigerant discharged from the refrigerant compressor 7 through the first electromagnetic valve 23, a refrigerant condenser 25, a receiver (vapor-liquid separator) 26, an expansion valve (first pressure reducing device) 27, the refrigerant evaporator 6, and an accumulator (vapor-liquid separator) 28 back to the refrigerant compressor 7, in that order. Namely, the refrigeration cycle circuit 21 is a refrigeration circuit in which the refrigerant evaporator 6 performs a air cooling operation by supplying low-temperature, low-pressure liquid refrigerant to the refrigerant evaporator 6 by allowing refrigerant to circulate through the refrigeration cycle circuit 21 when the first electromagnetic valve 23 opens and the second electromagnetic valve closes.

The hot gas heater circuit 22, which corresponds to the auxiliary heating unit according to the present invention, circulates hot, high-pressure gas refrigerant (hot gas) discharged from the refrigerant compressor 7 through the second electromagnetic valve 24, a pressure reducing device (second pressure reducing device) 29, the refrigerant evaporator 6, and the accumulator (vapor-liquid separator) 28 back to the refrigerant compressor 7 in that order. Namely, the hot gas heater circuit 22 is a refrigeration circuit in which the refrigerant evaporator 6 performs an air heating operation by allowing refrigerant to circulate through the hot gas heater circuit 22 when the first electromagnetic valve 23 closes and the second electromagnetic valve 24 opens.

The refrigerant evaporator 6 functions as a cooling heat exchanger for cooling air passing therethrough by evaporating low-temperature vapor-liquid two-phase refrigerant flowing thereinto from the expansion valve 27 when refrigerant flows through the refrigeration cycle circuit 21 and functions as a heating heat exchanger for heating air passing therethrough by evaporating high-temperature vapor-liquid two-phase refrigerant flowing thereinto from the pressure reducing device 29 when refrigerant flows through the hot gas heater circuit 22. Here, the expansion valve 27 is intended not only to insulate and expand refrigerant but also to regulate the circulating amount of refrigerant in accordance with the degree at which refrigerant that has exited from the refrigerant evaporator 6 is super-heated and a temperature sensing tube 27*a* for detecting the degree at which refrigerant is super-heated is connected to the expansion valve 27.

An electromagnetic valve 8 is coupled to the refrigerant compressor 7 for effecting and cutting off the transmission of the rotational power of the engine E to the refrigerant compressor 7. When the electromagnetic valve 8 is engergized (ON), the rotational power of the engine E is transmitted to the refrigerant compressor 7, and the refrigerant compressor 7 compresses and discharges refrigerant taken thereinto, whereby the air cooling operation or air heating operation is implemented by the refrigerant evaporator 6.

A heating unit comprising, for example, an electric heater 9, which is a feature of the present invention, is provided in the interior or on the circumference of the refrigerant compressor 7. A PTC heater, a nichrome wire heater or a glow plug heater is used as the electric heater 9 and is electrically connected to a battery installed in the automobile via a fuse 32 and a relay circuit 33. An alternator 34 adapted to be driven by the engine E to charge the battery 31 is electrically connected to the battery 31. In addition, the relay circuit 33 comprises a relay coil 33a which is switched on and off by the ECU 10 and a relay switch 33b which is closed when the relay coil 33a is switched on.

Furthermore, in the present invention, an electric heater 9b is provided in such a manner as to be brought into contact with an outer circumference of a suction pipe 30 connecting the refrigerant evaporator 6 with the accumulator (vapor-liquid separator) 28. This electric heater 9b is also electrically connected to the battery 31. Consequently, both the electric heater 9a and the electric heater 9b are electrically connected to the battery 31 in a parallel fashion.

Signals are inputted into the ECU 10 for controlling the respective air conditioning devices in the air conditioning unit 1 from respective switches on an air conditioner control panel provided on a front side of the passenger compartment of the vehicle. Furthermore, signals are also inputted into the ECU 10 from an inside air temperature sensor 104 for detecting the temperature of air inside the passenger compartment (inside air temperature), an outside air temperature sensor 105 for detecting the temperature of air outside the passenger compartment (outside air temperature), a post-evaporator temperature sensor 107 for detecting the temperature of air that has just passed through the refrigerant evaporator and a cooling water temperature sensor 108 for detecting the temperature of cooling water flowing into the hot-water heater 5. These respective switches and sensors are intended to detect air conditioning environmental factors needed to air condition the interior of the passenger compartment of the automobile.

In addition, a known microcomputer comprising a CPU, a ROM and a RAM is provided in the interior of the ECU 10, and signals from the respective sensors are designed to be inputted into the microcomputer after they have been A/D converted by an input circuit, not shown. Note that the ECU 10 is configured to start the control process when a direct-current power supply is supplied thereto from a battery (not shown), which is a power supply installed in the automobile, when the ignition switch (IG) which governs the start and stop of the engine E of the automobile is closed.

The automotive air conditioning system of the present invention, that is constructed as has been described heretofore, operates as will be described below. When the hot gas operation for heating the interior of the passenger compartment starts, the first electromagnetic valve 23 is closed and the second electromagnetic valve 24 is opened. In the event that the heating load becomes equal to or larger than a predetermined value after the engine has been started, the electric heaters 9a, 9b are switched on so as to heat the refrigerant compressor 7 and the suction pipe 30. As this occurs, any one of an outside air temperature detected by the outside air temperature sensor 105, the inside air temperature detected by the inside air temperature sensor 104, the air temperature downstream of the refrigerant evaporator detected by the post-evaporator air temperature sensor 107 and the cooling water temperature detected by the cooling water temperature sensor 108 is selected as a value representing the heating load. For example, in the event that the outside air temperature is lower than −30° C., which is the predetermined value, the electric heaters 9a, 9b are switched on.

In the event that the hot gas switch is not switched on even after a predetermined time ($T_2$) has elapsed since the electric heaters 9a, 9b were switched on after the engine E was started, namely, in the event that the electromagnetic clutch is switched on to thereby drive the refrigerant compressor 7 but the hot gas operation is not initiated, the electric heaters 9a, 9b are switched off.

In contrast, in the event that the hot gas switch is switched on and the hot gas operation is initiated, the electric heaters 9a, 9b are kept switched on as they are so as to continue to heat the refrigerant compressor 7 and the suction pipe 30 until a predetermined time ($T_1$) has elapsed since the engine E was started.

The aforesaid predetermined times ($T_1$, $T_2$) can be set at random according to the heating load.

In addition, the electric heater 9 for heating the suction pipe 30 is not necessarily provided.

Thus, according to the embodiment of the present invention, as the heating device is provided on the refrigerant compressor 7 so that the refrigerant compressor 7 is heated with the heating device prior to the operation of the hot gas, when activated in a condition where the outside air temperature is extremely low, the increase in the temperature of refrigerant within the hot gas cycle is improved, and the time needed before the hot gas cycle operates becomes shorter than that of the first embodiment, whereby the time needed before the passenger feels warmth becomes accordingly shorter. In addition, the pressure in the interior of the compressor is increased and the ingress of air into the interior of the compressor can be prevented.

Furthermore, as the heating devices are switched on during the operation of the hot gas, the heating performance improving effect which is equal to the quantity of heat generated by the heating devices can be obtained.

In addition, even when the automotive air conditioning system is initiated to implement the cooling operation in summer, fluid is accumulated within the interior of the compressor, and a fluid compression may be caused, leading to a failure of the compressor. Even when this occurs, however, by heating the compressor, fluid remaining within the compressor can be forced out of the compressor by evaporating the fluid.

Figure 7:
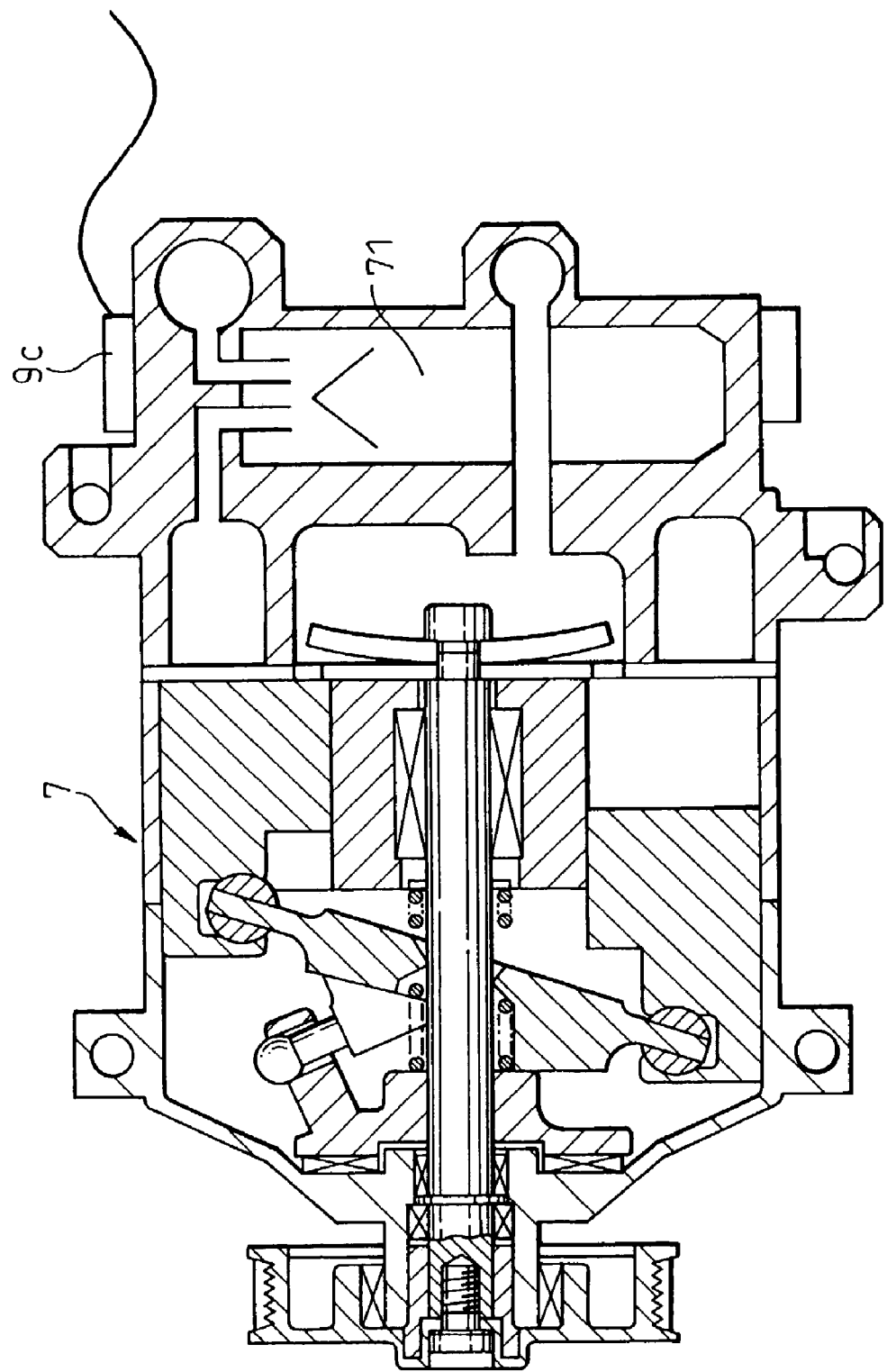
FIG. 7 is a sectional view of a refrigerant compressor of an automotive air conditioning system according to a fourth embodiment of the present invention.
Figure 8:
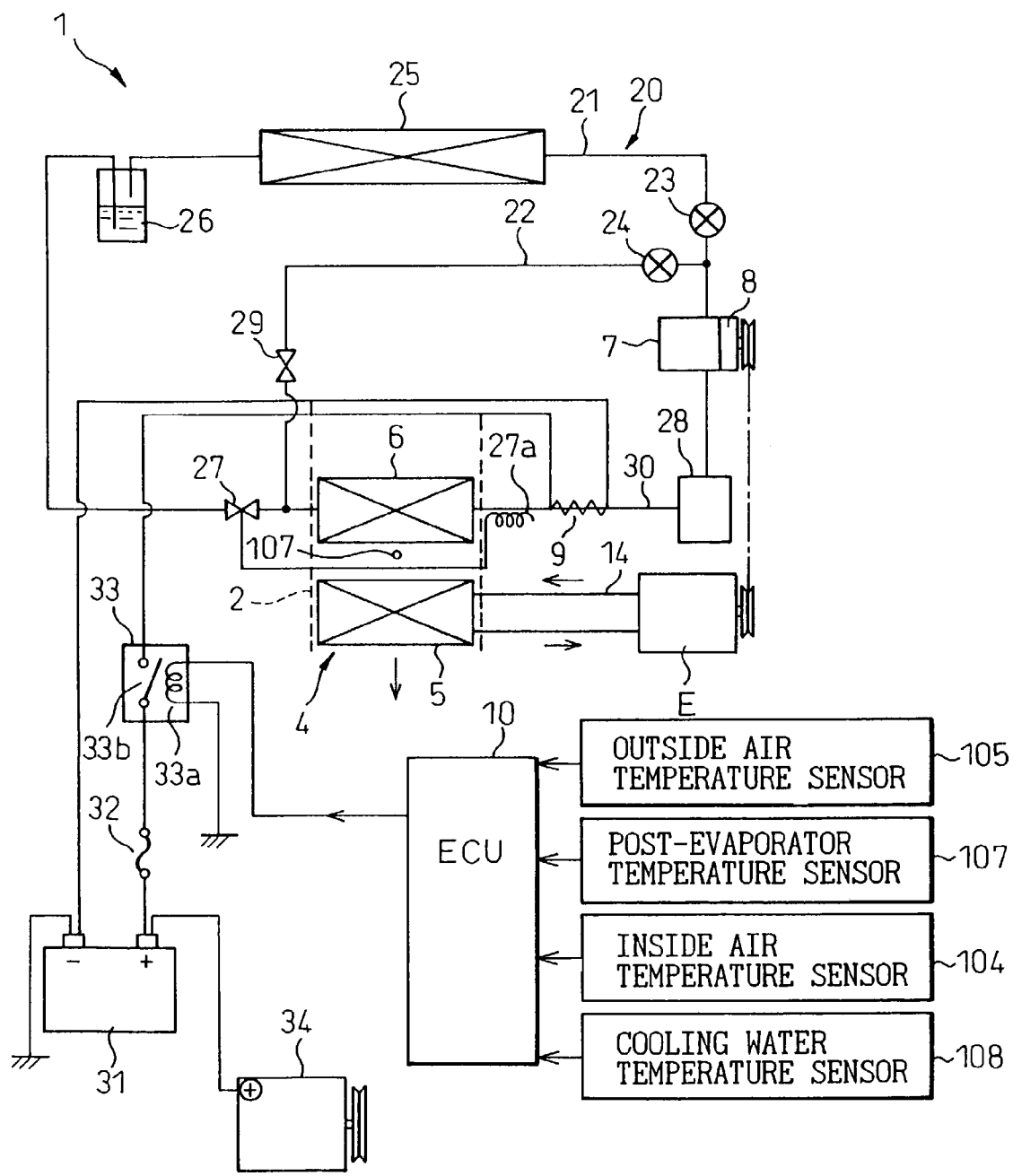
FIG. 8 is a diagram showing the overall construction of a conventional automotive air conditioning system.

FIG. 7 is a sectional view showing an automotive air conditioning system according to a fourth embodiment of the present invention. In this embodiment, a refrigerant compressor 7 integrally having therein a vapor-liquid separator 71 is used as the refrigerant compressor 7. A heating device for the refrigerant compressor 7 is provided as being inserted in the interior of the refrigerant compressor 7 or being wound around the circumference of the compressor or the vapor-liquid separator. In FIG. 7, an electric heater 9c is provided as being wound around the circumference of the vapor-liquid separator 71 integrally provided on the compressor. The remaining constructions thereof remain the same as those of the aforesaid embodiments.

Note that in FIG. 7, while a wobble or swash plate compressor is shown as being used as the compressor, the present invention is not limited to compressors of that type, and therefore, the present invention can be applied to compressors of any type.

In this embodiment, in addition to the effectiveness obtained by heating the refrigerant compressor 7 as has been described in the previous embodiment, liquid refrigerant accumulated in the interior of the vapor-liquid separator 71 integrally provided on the compressor can be evaporated by heating the vapor-liquid separator 71 with the heating device, so that the density of refrigerant increases and the flow rate of refrigerant increases, whereby the capacity of the hot gas cycle can remarkably be increased.

While the invention has been described by reference to the specific embodiments chosen for purposes of illustration, it should be apparent that numerous modifications could be made thereto by those skilled in the art without departing from the basic concept and scope of the invention.

The invention claimed is:

1. An automotive air conditioning system comprising:
an air conditioning duct for sending air into a passenger compartment of an automobile;
a main heating unit for heating air passing through said air conditioning duct using cooling water of an engine;
a refrigeration cycle device comprising:
a cooling refrigerant circulating circuit which includes a refrigerant compressor for introducing hot refrigerant into a refrigerant condenser, a first pressure reducing device and a refrigerant evaporator in that order, the refrigerant evaporator being connected to the refrigerant compressor to return said refrigerant to said refrigerant compressor,
a heating refrigerant circulating circuit which causes hot refrigerant discharged from said refrigerant compressor to bypass said refrigerant condenser so as to be introduced to a second pressure reducing device and said refrigerant evaporator in that order,
a heater mounted along a oath of said heating refrigerant circulating circuit,
an outside air temperature sensor for detecting a temperature of air outside the passenger compartment, and
an air conditioning control unit (ECU) for controlling the refrigeration cycle device, wherein the air conditioning control unit includes:
means for controlling the refrigerant compressor in a manner that when said automotive air conditioning system is operated using the heating refrigerant circulating circuit, said refrigerant compressor is switched on after a first predetermined time has elapsed after said engine is activated when the outside air temperature is egual to or lower than a predetermined value, and said refrigerant compressor is switched on without a delay of the first predetermined time when the outside air temperature is higher than the predetermined value,
means for controlling the heater in a manner that the heater is switched on in the event that the outside air temperature is equal to or lower than the predetermined value after the engine has been started, and is kept switched on until a second predetermined time longer than the first predetermined time has elapsed, thereby the heater has been switched on for the first predetermined time before the heating refrigerant circulating circuit is operated by switching the compressor on, and
means for determining the first predetermined time that represents a time to increase a temperature of said refrigerant in said heating refrigerant circulating circuit to prevent generation of negative pressure immediately after an activation of said refrigerant compressor under a condition where the outside air temperature is extremely low.

2. The automotive air conditioning system according to claim 1, further comprising:
a hot gas switch that is switched on when the operation of the heating refrigerant circulating circuit is required, wherein
the refrigerant compressor controlling means switches the refrigerant compressor on only when the hot gas switch is switched on, and
the heater controlling means switches the heater off after the second predetermined time when the hot gas switch is not switched on, and keeps the heater switched on until the second predetermined time has elapsed after the hot gas switch is switched on.

3. The automotive air conditioning system according to claim 1, wherein the extremely low outside temperature is equal to or less than −30° C.

4. The automotive air conditioning system according to claim 1, wherein the negative pressure is a pressure below atmospheric pressure.

5. An automotive air conditioning system comprising:
an air conditioning duct for sending air into a passenger compartment of an automobile;
a main heating unit for heating air passing through said air conditioning duct using cooling water of an engine;
a refrigeration cycle device comprising:
a cooling refrigerant circulating circuit which includes a refrigerant compressor for discharging refrigerant into a refrigerant condenser, a first pressure reducing device and a refrigerant evaporator in that order, the refrigerant evaporator being connected to the refrigerant compressor to return said refrigerant to said refrigerant compressor,
a heating refrigerant circulating circuit which causes the refrigerant discharged from said refrigerant compressor to bypass said refrigerant condenser so as to be introduced to a second pressure reducing device and said refrigerant evaporator in that order,
a heater disposed along a path of said heating refrigerant circulating circuit;
an outside temperature sensor for detecting a temperature of air outside the passenger compartment;
means for controlling the refrigerant compressor when the heating refrigerant circulating circuit is used to immediately switch on the refrigerant compressor when the outside temperature is higher than a predetermined temperature and to delay the switching on of the refrigerant compressor for a first predetermined time when the outside temperature is equal to or below the predetermined temperature; and
means for controlling the heater to switch on the heater for a second predetermined time greater than the first predetermined time when the outside temperature is equal to or below the predetermined temperature; and
means for determining the first predetermined time based on a time to increase a temperature of the refrigerant to prevent a pressure of the refrigerant being lower than atmospheric pressure when the refrigerant compressor is switched on.

6. The automotive air conditioning system according to claim 5, further comprising:
a hot gas switch that is switched on when the operation of the heating refrigerant circulating circuit is required, wherein
the refrigerant compressor controlling means switches the refrigerant compressor on only when the hot gas switch is switched on, and
the heater controlling means switches the heater off after the second predetermined time when the hot gas switch is not switched on, and keeps the heater switched on until the second predetermined time has elapsed after the hot gas switch is switched on.

7. An automotive air conditioning system comprising:
an air conditioning duct for sending air into a passenger compartment of an automobile;
a main heating unit for heating air passing through said air conditioning duct using cooling water of an engine;
a refrigeration cycle device comprising:
a cooling refrigerant circulating circuit which includes a refrigerant compressor for discharging refrigerant into a refrigerant condenser, a first pressure reducing device and a refrigerant evaporator in that order, the refrigerant evaporator being connected to the refrigerant compressor to return said refrigerant to said refrigerant compressor, a heating refrigerant circulating circuit which causes the refrigerant discharged from said refrigerant compressor to bypass said refrigerant condenser so as to be introduced to a second pressure reducing device and said refrigerant evaporator in that order, a heater disposed along a path of said heating refrigerant circulating circuit;

an outside temperature sensor for detecting a temperature of air outside the passenger compartment; and means for preventing a pressure of the refrigerant from being below atmospheric pressure when the heating refrigerant circulating circuit is activated, the preventing means including:

means for delaying the switching on of the refrigerant compressor for a first predetermined time when the outside temperature is equal to or below a predetermined temperature;

means for switching on the heater for a second predetermined time greater than the first predetermined time when the outside temperature is equal to or below the predetermined temperature; and means for determining the first predetermined time based on a time to increase the pressure of the refrigerant to the atmospheric pressure.

8. The automotive air conditioning system according to claim 7, further comprising:

a hot gas switch that is switched on when the operation of the heating refrigerant circulating circuit is required, wherein the refrigerant compressor controlling means switches the refrigerant compressor on only when the hot gas switch is switched on, and the heater controlling means switches the heater off after the second predetermined time when the hot gas switch is not switched on, and keeps the heater switched on until the second predetermined time has elapsed after the hot gas switch is switched on.

9. The automotive air conditioning system according to claim 7, wherein the means for delaying the switching on of the refrigerant compressor switches on the refrigerant compressor without delay when the outside temperature is above the predetermined temperature.

* * * * *